Figure 1:
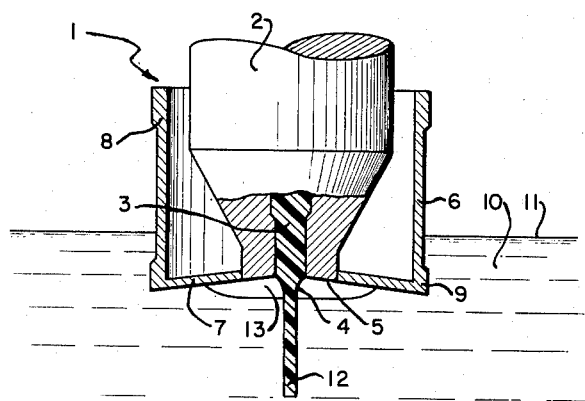

Sept. 14, 1965  J. W. IJ. HEIJNIS  3,206,529
EXTRUSION PROCESS AND APPARATUS
Filed Oct. 31, 1962

INVENTOR.
JAMES W. I. HEIJNIS
BY Robert W. Habel
ATTORNEY

United States Patent Office 3,206,529
Patented Sept. 14, 1965

3,206,529
EXTRUSION PROCESS AND APPARATUS
James W. Ij. Heijnis, Arnhem, Netherlands, assignor to American Enka Corporation, Enka, N.C., a corporation of Delaware
Filed Oct. 31, 1962, Ser. No. 234,455
Claims priority, application Netherlands, Nov. 30, 1961, 272,045
10 Claims. (Cl. 264—178)

This invention relates generally to the extrusion of thermoplastic material and more particularly to a process and apparatus for the melt extrusion of thermoplastic material to produce endless articles having a uniform cross section such ribbons, filaments, threads and the like.

It is known that thermoplastic polymers may be extruded into endless articles having a uniform cross section, the process being one in which the polymer is extruded while in the molten state into a cooling liquid bath with the extrusion die immersed in the bath so as to cover at least its orifices. In addition, the die is surrounded by an insulating ring. The thermoplastic polymer is extruded in a horizontal direction through the die, the outer surface or face of which is in contact with the cooling liquid bath. To prevent the die from cooling through contact with the bath, it is commonly made of polytetrafluoroethylene combined with a filler such as finely divided silica. Water in which a surface active substance is dissolved is used as the bath. A surface active substance is necessary since the use of pure water as a cooling liquid results in non-uniform extrusion of the polymer through the die.

This known process has some advantages over the more common melt extrusion process in which the extruded polymer passes through an air zone before reaching the cooling liquid. In this latter process superficial oxidation of the polymer occurs, and, if present, low-molecular weight compounds, such as plasticizers or monomer, may evaporate or sublime forming undesirable deposits on the apparatus. These disadvantages are particularly noticeable with polyamides.

However, there are also disadvantages with the first mentioned known process, one of which is that the material from which the extrusion die is made is subject to deformation at high process temperatures and consequently is easily damaged. Moreover, such a die is difficult to clean. Another disadvantage is that the die has poor thermal conducting properties which results in its temperature being dependent on the feed rate of the molten polymer. Thus, extrusion must first proceed for some time without the use of the cooling liquid until the die has reached a predetermined high temperature, after which the cooling liquid may enter the appropriate trough. Because of this, an undesirably large amount of waste is obtained. Furthermore, the necessity of having a surface active substance in the cooling liquid creates another problem, since such substance penetrates the extruded product. This is undesirable in many cases, especially if the extruded article such as a ribbon is to be chopped into granules for use as the starting material in the spinning of threads or for the injection molding of articles.

Accordingly, it is an object of this invention to provide a process and apparatus for the melt extrusion of thermoplastic material into endless articles that do not have the disadvantages of the known processes and apparatus.

Another object of this invention is to provide a process and apparatus for the melt extrusion of thermoplastic material into endless articles in which the amount of waste produced thereby is minimized.

Still another object is to provide a process and apparatus for the melt extrusion of thermoplastic material in which it is unnecessary that the extrusion die be made from a poor thermal conducting material.

A further object is to provide a process and apparatus for extruding thermoplastic material in which the thermoplastic material is uniformly extruded through the die without the aid of a surfactant in the cooling bath.

A still further object is to provide a process and apparatus for extruding thermoplastic material in which undesirable deposits are prevented from forming on the extruder die.

These and other objects will become apparent from the following detailed description.

The invention comprises extruding thermoplastic material downwardly into a cooling liquid bath such that between the outer surface of the extruder die and the cooling liquid an insulating layer of vapor from the cooling liquid is formed. This is accomplished by using a die having a concave outer surface. Thus, the outer surface of the die is provided with an indentation in which a vapor bubble may form. The indentation may be any symmetrical shape, such as for example spherical, cone shaped, or a triangular prism.

In the process of this invention, there is no need to use a die made of material of poor thermal conductivity. The vapor bubble which is formed around the orifice as soon as extrusion has started, insulates the outer surface of the die from the cooling liquid such that the temperature of the die near the orifice does not go below the melting point of the polymer extruded. Consequently, metal dies may be used safely, for example, dies of stainless steel. Thus, since the temperature of a metal die is practically independent of the rate at which the molten polymer is supplied, the extrusion process may be carried out from the beginning with the opening of the die immersed in the cooling liquid bath.

An additional advantage of a die having a constant temperature when carrying out the present process is that without changing the die, the thickness of the article extruded may be varied by altering the feed rate of the molten polymer while keeping the drawing off rate of the product constant. This is obvious when it is considered that the thickness of the article extruded increases with the feed rate of the molten polymer. Moreover, the thickness of the extruded product may be varied by changing the drawing off rate while maintaining the other conditions constant, it being clear that the thickness of the product extruded is decreased as the rate at which it is drawn off from the cooling liquid is increased.

With the process of this invention, it is possible to use the same die to manufacture products having widely different weights per unit length. Thus the same die may be used to obtain articles having weights per unit length as high as ten times the smallest weight per unit length that may be produced.

There is no need to dissolve a surface active substance in the cooling liquid which, as mentioned heretofore, may penetrate the extruded product and is often undesirable. It should be noted, however, that as in the known process, the cooling liquid may be water. Since air dissolves in water, it is preferred to use deaerated water. This is because dissolved air may be freed from the water in the vicinity of the hot die and polymer and pass into the vapor bubble, in this case steam near the die, resulting in the extruded product being subjected to superficial oxidation. The cooling water may be deaerated by successively heating and cooling it.

The endless products entering the cooling bath may be discharged by passing them over guides. In one embodiment, the extrusion takes place at the end of a tube, the other end of which opens into a vessel having a cooling liquid level lower than that in the tube. As a result, cooling liquid flows through the tube, such that the extruded product is entrained. When using this apparatus, there are no difficulties in starting up the spinning operation. Immediately upon starting the extrusion process, the shaped article is entrained by the flowing cooling liquid and is carried off at the discharge end of the tube. In another embodiment, a simple trough containing the cooling liquid is used with the polymer extruded into the bath at one end and the product drawn off at the other end.

The temperature of the cooling liquid is dependent on the polymer to be extruded and on the end-product. In general, water at room temperature is used. If the extruded endless products are to be chopped up for the manufacture of injection molding granules, it may be advantageous to use water having a temperature of, for instance, 80° C. After the solid extruded articles have left the cooling water, they are still warm. This facilitates the chopping operation, particularly with a polyamide such as nylon 6.

The apparatus used in carrying out the process of this invention comprises an extruder having a die surrounded by an insulating ring, together with a trough for the cooling liquid, with the parts positioned so that the face of the die is immersed in the cooling liquid. The face of the die is disposed downwardly and is concave so that during extrusion a vapor bubble forms around and under the orifice.

The concave shape of the outer surface of the die can be varied. Thus, it may be spherical, cone shaped, or a triangular prism. However, it is preferred to use a die, the outer surface of which has the shape of a cone having an obtuse apex angle. With this shape, the vapor bubble formed against the die is very stable. Best results are obtained using an apex angle of about 160°.

The insulating ring surrounding the die may be composed of various materials. For example, it can be made of a mixture consisting substantially of asbestos and magnesium oxide. It is also possible to use heat-resistant plastics. Preferably, the insulating ring is formed by a layer of air bounded on the outside of the die by a tubular member concentrically positioned around the outer surface of the die and connected with the die by means of a metal plate, the outer surface of which forms a continuation of the concave facial surface of the die. The metal plate should preferably have a thickness of 0.2 to 0.5 mm. A plate considerably thicker than this, for instance, 1 mm. might conduct too much heat from the die and attain such a high temperature that the vapor bubble would become large enough to escape upward along the edge of the plate. Such would unfavorably affect the uniformity of the extruded article. The connections between the tube, plate, and die are easily made, for instance, by welding or using a hard solder. Connections thus made are not attacked under the process conditions.

For purposes of illustration and not by way of limitation, reference is invited to the accompanying drawings showing various embodiments of the extruder dies that may be used in the process of this invention.

Figure 2:
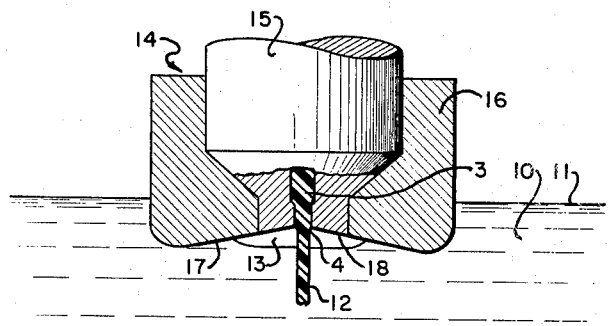

FIGURE 1 is an elevational view partly in section of a die in which air is used as the insulating ring; and FIGURE 2 is a similar view showing a die in which a solid is used as the insulating ring.

In FIGURE 1 the numeral 1 refers generally to one embodiment of an extrusion assembly made according to the invention. The assembly consists of a die 2 in which there is a channel 3 through which molten polymer is forced with the aid of an extruder (not shown). Channel 3 ends in an opening 4 in the outer surface or face 5 of die 2. This figure shows that the outer surface is concave in the shape of a cone having an obtuse apex angle. Around die 2 there is provided a metal cylinder 6 concentrically disposed. The cylinder 6 is connected with die 2 by means of a metal plate 7. The outer surface of plate 7 forms a continuation of the concave outer surface 5 of the die 2. Die 2 and plate 7 may be made in one piece, the cylinder 6 being welded or soldered to the edge of plate 7. Cylinder 6 is reinforced by thickened sections 8 and 9. Between cylinder 6 and die 2 an air-filled space is formed which serves as a heat insulation for the die 2.

During operation, the extrusion assembly 1 is partially immersed in water 10, the level of which is referred to by numeral 11. The molten polymer forced through channel 3 is extruded as thread 12, a steam bubble 13 forming against the outer surface 5 of die 2 and plate 7.

In FIGURE 2, the numeral 14 refers to an alternate extrusion assembly embodiment which consists of die 15 surrounded by a ring-shaped element 16 made of a heat-insulating material, such as a mass of asbestos and magnesium oxide sintered under pressure. The underside 17 of the ring-shaped element 16 forms a continuation of the concave outer surface 18 of the extrusion die 15. The other reference numerals in this figure correspond with those in FIGURE 1.

The extrusion assemblies 1 and 15 shown in FIGURES 1 and 2 also may be provided with more than one extrusion opening 4. In that case, the dies 2 and 15 are provided with more than one channel 3, or with a single channel having as many branches as there are extrusion openings. When using such a die, a plurality of threads or other endless articles may be manufactured simultaneously. The openings may be provided in a circle around the center of the outer surface of the die or in a straight line. In the latter case, the horizontal section of the extrusion die is not circular but oblong.

By using the process and apparatus of this invention, endless articles can be obtained which have an unusually high degree of cross section uniformity. Since the process does not require the aid of a surfactant in the cooling water bath, undesirable penetration of the product with this substance is thus avoided. Furthermore, the production of waste is greatly minimized.

Other modifications, alterations, and embodiments within the scope of the invention will be apparent to those skilled in the art. The invention is, therefore, intended to be limited only as set forth in the following claims.

What is claimed is:

1. Apparatus for producing thermoplastic structure from molten polymer comprising an extruding die having an extruding face immersed in a body of cooling liquid and said extruding die being shaped to maintain on said face a vapor bubble created in the liquid by the heat of the extrusion.

2. Apparatus for producing thermoplastic structure from molten polymer which comprises a liquid cooling bath, a radially insulated extruding die extending downwardly into said bath and having an extruding face exposed to liquid therein said extruding face being shaped to maintain a vapor bubble thereon to prevent contact of said face with the cooling liquid.

3. Apparatus as defined in claim 2 in which the extruding face has a concave depression therein.

4. Apparatus as defined in claim 2 in which the radial insulation is an annular trough surrounding said extruding die.

5. Apparatus as defined in claim 2 in which the radial insulation is a ring of asbestos and magnesium oxide sintered under pressure surrounding said extruding die.

6. A method of extruding thermoplastic structure from molten polymer into a cooling liquid comprising (1) passing a molten polymer through a forming orifice into the cooling liquid; and (2) maintaining a vapor zone in said cooling liquid surrounding said forming orifice to prevent direct contact of said cooling liquid with said forming orifice.

7. A method as defined in claim 6 in which said vapor zone is created in the cooling liquid by the heat of extrusion of the molten polymer.

8. A method of extruding a thermoplastic structure from molten polymer in the absence of contact of the polymer with the atmosphere which comprises the steps of (1) passing molten material from a heated material shaping zone into a liquid cooling zone, (2) vaporizing a portion of liquid in said liquid cooling zone, and (3) maintaining said vaporized portion in a vapor zone adjacent said material shaping zone to prevent contact of said material shaping zone and said liquid cooling zone during passage of said molten material thereto.

9. A method as defined in claim 8 in which said vapor zone is created in the liquid cooling zone by the effect of heat from the material shaping zone.

10. A method of extruding a thermoplastic structure from molten polymer in the absence of contact of the polymer with the atmosphere which comprises the steps of (1) passing molten material from a heated material shaping die into a liquid cooling zone surrounding said die, and (2) maintaining a vapor bubble in the liquid and around the face of the die to prevent contact of the liquid with the face of the die during passage of molten material therefrom.

References Cited by the Examiner

UNITED STATES PATENTS

| | | | |
|---|---|---|---|
| 2,820,252 | 1/58 | Koch | 264—178 |
| 3,039,142 | 6/62 | Zavasnik | 18—12 |
| 3,126,434 | 3/64 | Berger | 264—178 |

FOREIGN PATENTS 901,398   7/62   Great Britain.

ALEXANDER H. BRODMERKEL, *Primary Examiner.*
WILLIAM J. STEPHENSON, *Examiner.*